(12) United States Patent
Blalock et al.

(10) Patent No.: US 7,006,746 B2
(45) Date of Patent: Feb. 28, 2006

(54) WAVEGUIDE FOR THERMO OPTIC DEVICE

(75) Inventors: Guy T. Blalock, Boise, ID (US);
Howard E. Rhodes, Boise, ID (US);
Vishnu K. Agarwal, Boise, ID (US);
Gurtej Singh Sandhu, Boise, ID (US);
James S. Foresi, Waltham, MA (US);
Jean-Francois Viens, Boston, MA
(US); Dale G. Fried, Dedham, MA
(US)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 10/233,000

(22) Filed: Aug. 29, 2002

(65) Prior Publication Data

US 2004/0042751 A1 Mar. 4, 2004

(51) Int. Cl.
*G02B 6/10* (2006.01)

(52) U.S. Cl. ........................................................ 385/131
(58) Field of Classification Search ......... 385/129–132, 385/14
See application file for complete search history.

(56) References Cited

U.S. PATENT DOCUMENTS

| 4,799,749 A | * | 1/1989 | Borner et al. .................. 385/14 |
| 5,639,386 A | | 6/1997 | Burke, et al. |
| 5,710,849 A | | 1/1998 | Little et al. |
| 5,841,931 A | | 11/1998 | Foresi et al. ................. 385/131 |
| 5,987,196 A | | 11/1999 | Noble .......................... 385/14 |
| 6,052,495 A | * | 4/2000 | Little et al. ..................... 385/2 |
| 6,090,636 A | | 7/2000 | Geusic et al. .................. 438/31 |
| 6,101,300 A | | 8/2000 | Fan et al. |
| 6,108,464 A | | 8/2000 | Foresi et al. ................... 385/14 |
| 6,150,188 A | | 11/2000 | Geusic et al. .................. 438/31 |
| 6,396,988 B1 | | 5/2002 | Shimoda |
| 6,411,752 B1 | | 6/2002 | Little, et al. |
| 6,433,919 B1 | | 8/2002 | Chowdhury et al. |
| 6,453,377 B1 | | 9/2002 | Farnworth et al. .......... 710/300 |
| 6,519,658 B1 | | 2/2003 | Farnworth et al. ............ 710/13 |
| 6,522,812 B1 | | 2/2003 | Nikonov |
| 6,526,191 B1 | | 2/2003 | Geusic et al. .................. 385/14 |
| 6,532,326 B1 | | 3/2003 | Hutchinson et al. |
| 6,567,573 B1 | | 5/2003 | Domash et al. |
| 6,573,813 B1 | | 6/2003 | Joannopoulos et al. ..... 333/249 |

(Continued)

OTHER PUBLICATIONS

Damask, Jay N., "Integrated–Optic Grating–Based Filters for Optical Communication Systems", Doctoral Thesis, Department of Electrical Engineering, Massachusetts Institute of Technology,(May 6, 1996),143–183.

*Primary Examiner*—Joseph Williams
*Assistant Examiner*—Peter Macchiarolo
(74) *Attorney, Agent, or Firm*—Schwegman, Lundberg, Woessner & Kluth, P.A.

(57) ABSTRACT

A waveguide and resonator are formed on a lower cladding of a thermo optic device, each having a formation height that is substantially equal. Thereafter, the formation height of the waveguide is attenuated. In this manner, the aspect ratio as between the waveguide and resonator in an area where the waveguide and resonator front or face one another decreases (in comparison to the prior art) thereby restoring the synchronicity between the waveguide and the grating and allowing higher bandwidth configurations to be used. The waveguide attenuation is achieved by photomasking and etching the waveguide after the resonator and waveguide are formed. In one embodiment the photomasking and etching is performed after deposition of the upper cladding. In another, it is performed before the deposition. Thermo optic devices, thermo optic packages and fiber optic systems having these waveguides are also taught.

29 Claims, 10 Drawing Sheets

U.S. PATENT DOCUMENTS

| | | | |
|---|---|---|---|
| 2002/0186920 A1 | 12/2002 | Viens et al. | 385/27 |
| 2003/0026575 A1 | 2/2003 | Lempkowski | |
| 2003/0169964 A1 | 9/2003 | Wang et al. | 385/27 |
| 2003/0174945 A1 | 9/2003 | Fried et al. | 385/37 |
| 2003/0174946 A1 | 9/2003 | Viens | 385/37 |
| 2003/0174956 A1 | 9/2003 | Viens | 385/43 |
| 2003/0197186 A1 | 10/2003 | Geusic | 257/80 |
| 2003/0202548 A1 | 10/2003 | Andersen, et al. | |
| 2004/0037341 A1 | 2/2004 | Tan, et al. | |

* cited by examiner

WAVEGUIDE FOR THERMO OPTIC DEVICE

FIELD OF THE INVENTION

The present invention relates to thermo optic devices, such as optical waveguides. In particular, it relates to efficiently formed input and output waveguides having increased bandwidth.

BACKGROUND OF THE INVENTION

The art of making and developing new uses for thermo optic devices continues to emerge. Presently, thermo optic devices are used as filters, switches, multiplexers, waveguides, and a host of other semiconductor and optical transmission devices.

With reference to FIGS. 1A and 1B, a prior art thermo optic device in the form of an optical waveguide is shown generally as 110. It comprises a grating 112 formed of a lower cladding 114, an upper cladding 116, an input waveguide 118, an output waveguide 120 and a grating waveguide and an optional resonator 122. As is known, the waveguides and resonator are formed of a material having a higher refractive index than that of the upper and lower claddings to propagate light therein during use. The grating 112 is disposed on a substrate 124. In many thermo optic devices the substrate is a printed circuit board or some form of silicon.

In forming the device, the lower cladding is deposited on the substrate. An intermediate layer, for the waveguides and resonator, is deposited on the lower cladding, photo patterned and etched. The upper cladding is deposited on the waveguides and resonator. In an alternate formation process, the lower cladding 206 is an oxidation of a silicon substrate with the waveguides, resonator and upper cladding being formed in the same manner.

The inherent characteristics of waveguides and resonators, such as their sizes, shapes, compositions, etc., may vary greatly from application to application. The characteristics of all waveguides and resonators, however, are generally selected in such a manner to eliminate crosstalk between the input and output waveguides at undesirable frequencies and to resonate signals (i.e., prolong and/or intensify) which allows transfer between the waveguides at desirable frequencies. The undesirable frequencies are not transferred between the two waveguides. The range of frequencies that are not transferred is determined by the properties of the grating, and is typically referred to as the bandwidth. The frequencies that are transferred are determined by the specific designs of the grating resonator waveguides.

In the representative prior art embodiment shown in FIG. 1B, the resonator 122 has a generally symmetrical tooth-shaped pattern. To set the center frequency, the grating corrugation period is adjusted by adjusting the pitch (distance) between the teeth.

As part of the task of setting the bandwidth, an aspect ratio is adjusted in an area where the waveguide and resonator front or face one another. It is not possible to change the bandwidth by only changing the aspect ratio. The grating strength changes the bandwidth and it is necessary to change the aspect ratio to allow the device to operate appropriately.

For example, in FIG. 1A, resonator 122 has a surface 123 facing a surface 119 of input waveguide 118. The aspect ratio (a.r.) in this area is defined as the area of the input waveguide surface to the area of the resonator surface (a.r.=area of input waveguide surface/area of resonator surface). A large bandwidth corresponds to a small aspect ratio while a small bandwidth corresponds to a large aspect ratio. Correspondingly, a large bandwidth can be achieved by either increasing the area of the resonator surface, decreasing the area of the input waveguide surface, or adjusting both surface areas in such a manner to achieve a relatively small ratio number. A small bandwidth can be achieved by either decreasing the area of the resonator surface, increasing the area of the input waveguide surface, or adjusting both surface areas in such a manner to achieve a relatively large ratio number. Even further, increases or decreases of surface area can be achieved by adjusting one or both of the surface dimensions of the waveguide or resonator surfaces. For example, depth "D" of surface 119 or 123 may be increased or decreased according to desired bandwidth.

In other words, to set the bandwidth, the strength of the grating between the input and output waveguides is increased. As the grating strength is increased, the difference in effective index for waveguides with and without gratings becomes increasingly difficult to maintain. The difference in effective index for coupled devices such as these is typically referred to as asynchronicity. The term asynchronicity indicates that the propagation constant at the resonant wavelength is different for the waveguide and grating, which limits the amount of light that can be coupled between them. The problem of asynchronicity becomes even more problematic when it is desirable to achieve polarization independent devices, as is required for commercial fiber optic components. In this case, coupling between the grating and waveguide requires synchronicity for both of the orthogonal polarization states of the system.

Methods for trimming the effective index of the waveguide to match the grating, or grating to match the waveguide, are required to achieve optimal performance from coupled systems such as the waveguide/grating coupler system. Trimming approaches have been defined elsewhere (See "Integrated-Optic Grating-Based Filters For Optical Communication Systems" by Jay Northrop Damask, Massachusetts Institute of Technology thesis, available Jul. 16, 1996, chapter 4), but are not generalized for addressing arbitrary waveguide combinations, or are not compatible with standard processing techniques.

Since the resonator 122 and the input and output waveguides 118, 120 are formed together during the same process steps as described above, the depth, D, of the resonator is essentially fixed as the same depth of the waveguides and therefore the asynchronicity limits the bandwidths and grating strengths that can be used.

Accordingly, the thermo optic arts desire waveguides having increased bandwidths that are relatively cheap and quick to produce without sacrifices in quality, reliability or longevity.

SUMMARY OF THE INVENTION

The above-mentioned and other problems become solved by applying the apparatus and method principles and teachings associated with the hereinafter described waveguide for thermo optic device.

In one embodiment, a waveguide and resonator are formed on a lower cladding of the thermo optic device, each having a formation height that is substantially equal. Thereafter, the formation height of the waveguide is attenuated. In this manner, the effective index between the waveguide and grating can be matched, thereby allowing the synchronicity requirements to be met for larger bandwidth devices. The waveguide attenuation is achieved by photomasking and etching the waveguide after the resonator and waveguide are formed. In one embodiment the photomasking and etching is performed after deposition of the upper cladding. In another, it is performed before the deposition.

In another embodiment, a plurality of waveguides, an input and output waveguide, are attenuated from their respective formation heights to a different or substantially equal waveguide height. In still another embodiment, a plurality of resonators are formed between the input and output waveguides.

In still another embodiment, resonator(s) are attenuated before or after deposition of the upper cladding.

Thermo optic devices, thermo optic packages and fiber optic systems having these waveguides are also taught.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

Figure 1A:
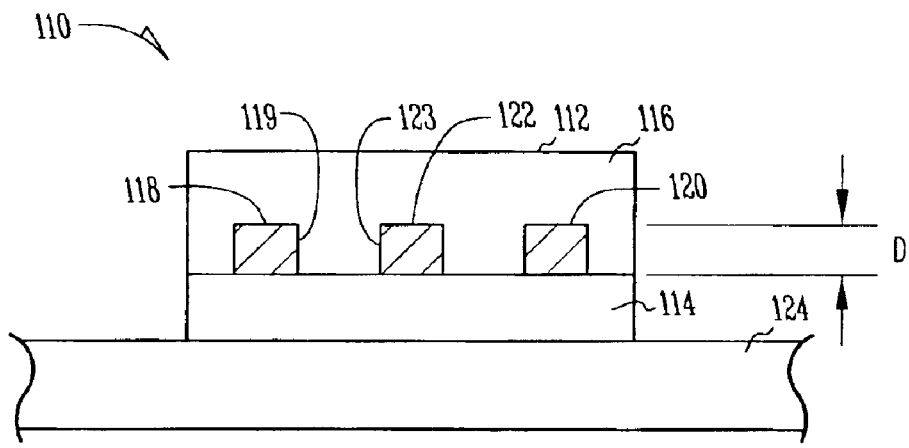
FIG. 1A is a cross sectional view of a thermo optic device in the form of an optical waveguide in accordance with the prior art.
Figure 1B:
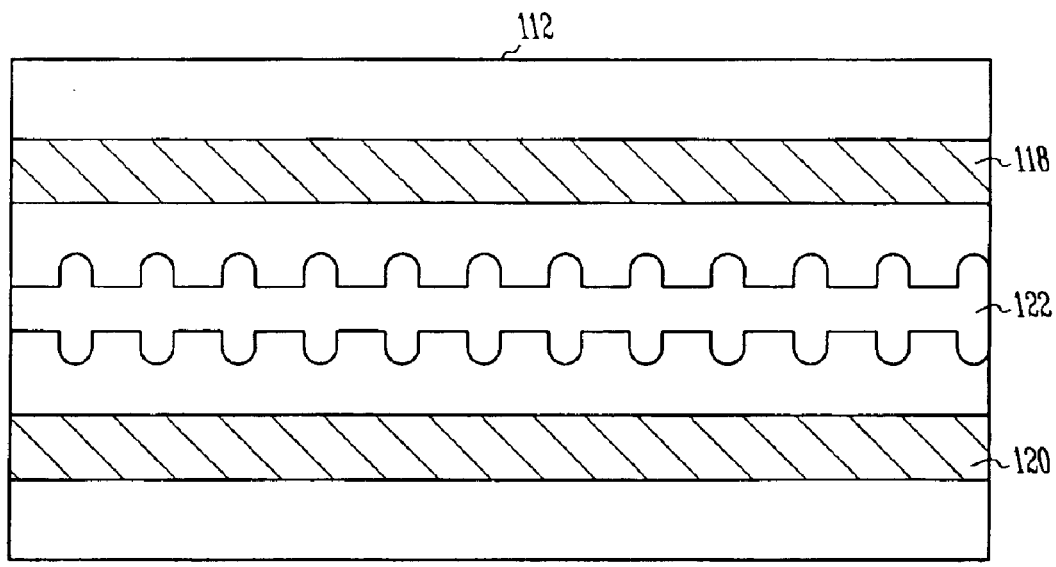
FIG. 1B is a planar view of the thermo optic device of FIG. 1A.

In the following detailed description of the preferred embodiments, reference is made to the accompanying drawings which form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical or mechanical changes may be made without departing from the scope of the present invention. The term substrate used in this specification includes any base semiconductor structure such as silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. The following detailed description is, therefore, not to be taken in a limiting sense, and the scope of the present invention is defined only by the appended claims and their equivalents.

The following description and figures use a reference numeral convention where the first digit of the reference numeral corresponds to the figure and the following two digits correspond to like elements throughout the specification. For example, the lower cladding of a thermo optic device of the present invention has a reference number of 202, 302, 402, etc. corresponding to the lower cladding X02 in FIGS. 2, 3, 4, etc. where X is the number of the figure in which the reference numeral appears.

For definition purposes: a "formation height," either waveguide or resonator, is a height before any attenuation is performed to a structure and is to be distinguished from a resonator "height" or waveguide "height" which is the height of a structure after some attenuation has been performed. In other words, the two words "formation height" will be used to identify heights of structures pre-attenuation and the single word "height" will be used to identify structures post-attenuation. For example, in the event a structure itself was not attenuated, its "formation height" will be the same as its "height" after another structure has been attenuated, i.e., the resonator formation height in FIG. 2C is the same as the resonator height in FIG. 2F. In contrast, in the event a structure has been attenuated, its "formation height" will be taller than its "height" after attenuation, i.e., the input waveguide formation height of FIG. 2C is taller than the input waveguide height of FIG. 2F.

Figure 2A:
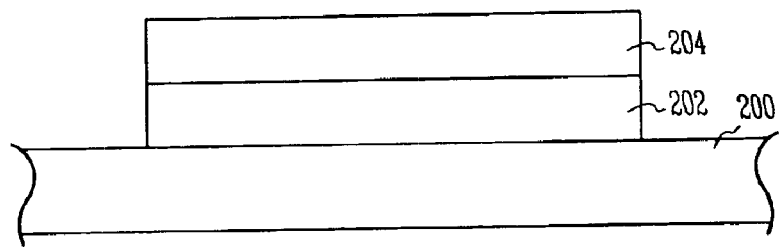
FIG. 2A is a cross sectional view of a lower cladding on which a waveguide in accordance with the teachings of the present invention will be formed.

With reference to FIG. 2A, a substrate 200 is provided upon which a waveguide for use with a thermo optic device will be formed. In one embodiment the substrate is silicon. In another, it is a printed circuit board. In still another, it is any surface upon which a layer may be deposited.

A first layer 202 or lower cladding is formed on the substrate. In one embodiment, the substrate is some form of silicon and the first layer is a grown layer via oxidation of the substrate. In another embodiment, the first layer is a deposited layer.

Some techniques for depositing the first layer, and all remaining deposited layers, include, but are not limited to, any variety of chemical vapor depositions (CVD), physical vapor depositions (PVD), epitaxy, evaporation, sputtering or other known or hereinafter developed techniques. Specific CVD techniques include low pressure (LP) ones, but could also be atmospheric pressure (AP), plasma enhanced (PE), high density plasma (HDP) or other.

In still another embodiment, the first layer is a silicon oxide that is deposited via a LPCVD technique using a tetraethyl orthosilicate or TEOS source.

After depositing the first layer, a second layer 204 is deposited on the first layer using one of the above or other deposition techniques. In one embodiment, the second layer is a silicon oxynitride deposited with a PECVD technique using a silane with nitrous oxide reaction in an argon or helium plasma, under the conditions of 450° C., 450 watts and 13.56 MHz. In another embodiment, the second layer is a translucent material.

While the lower cladding, in one embodiment, was formed of a silicon oxide and the second layer was formed of silicon oxynitride, it should be appreciated that numerous other materials for these first and second layers exist. One skilled in the art will understand that a variety of anneal steps can follow the above steps.

The selection of the layers is dictated by the index of refraction, absorption in the wavelength range of interest, thermo-optic coefficients and other optical and mechanical properties. The second layer will be formed into the waveguide and grating and light will propagate there by virtue of total internal reflection of light. So long as the second layer is a material having an index of refraction that is higher than the index of refraction for the first layer at the wavelength of interest, light signals will be guide and propagated in the device.

Figure 2B:
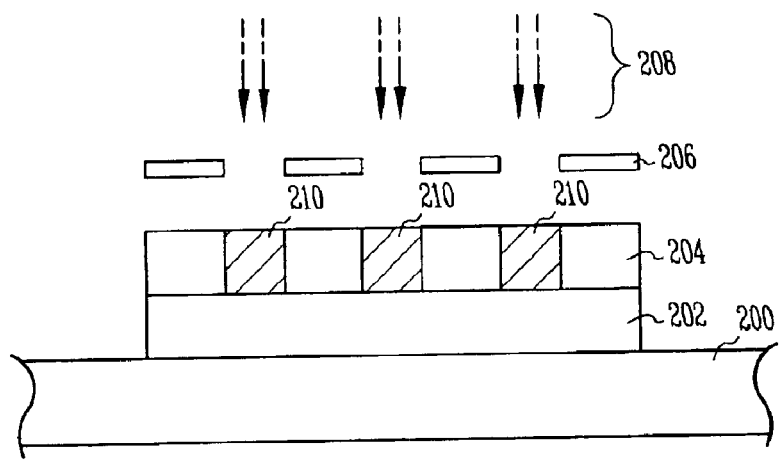
FIG. 2B is a cross sectional view in accordance with the teachings of the present invention of a first photomasking step in a processing step subsequent to FIG. 2A.
Figure 2C:
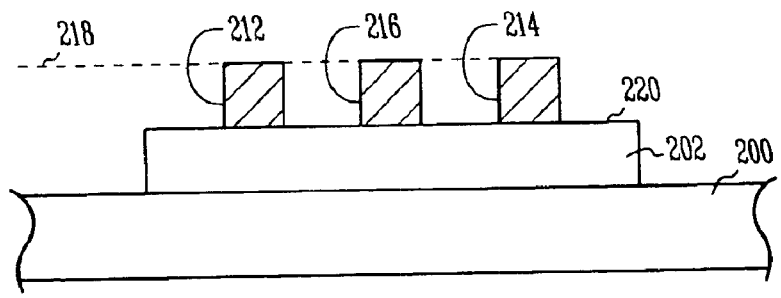
FIG. 2C is a cross sectional view in accordance with the teachings of the present invention of waveguides and resonators formed on a lower cladding in a processing step subsequent to FIG. 2B.

In FIG. 2B, a first mask 206 is provided to photo impact 208 the second layer 204 in a photomasking step thereby producing a photo impacted region 210 in the second layer on top of the lower cladding.

In one embodiment, the photo impacting is accomplished with an ultraviolet light from a photolithography device well known to those skilled in the art. The photo impacting, however, should not be limited to such an embodiment and may alternatively include X-rays or other light sources.

The first mask 206 may be configured as a clear-field or dark-field mask, as those terms as well understood by skilled artisans, according to the desired design of the photo impacted region 210 in the second layer.

Thereafter, with reference to FIG. 2C, the second layer 204 is etched so that the photo impacted region 210 remains thereby leaving or forming a waveguide and resonator on the surface 220 of the lower cladding, first layer 202. In particular, an input waveguide 212, an output waveguide 214 and a resonator 216, between the input and output resonators to couple light signals from the input to the output during use, are formed on the surface 220. Each of the waveguides and resonator have a formation height that is substantially equal since they were formed together in the same process. This height is measured from the surface 220 of the first layer 202 to plane 218. Although no particular formation height is required for this invention, for reference purposes, the formation height is often about 1 to about 2 microns. The height depends upon the particular application in which the thermo optic device will be used and the optical properties of the layers.

Some particular etching techniques embraced by this invention for forming the waveguides and resonators by leaving the photo impacted region 210 on the lower cladding include, but are not limited to, any variety of wet etches including immersion or spray, or dry etches including plasma, barrel or planar, ion milling, reactive ion etches (RIE) or deep RIE.

In one particular embodiment of the invention, the second layer is dry etched with a photo resist pattern and $CF_4$ or $CF_4CHF_3$ Argon based chemistry in a parallel plate reactor under the conditions of about 50 militorr, 600 watts and 13.56 MHz.

Figure 2D:
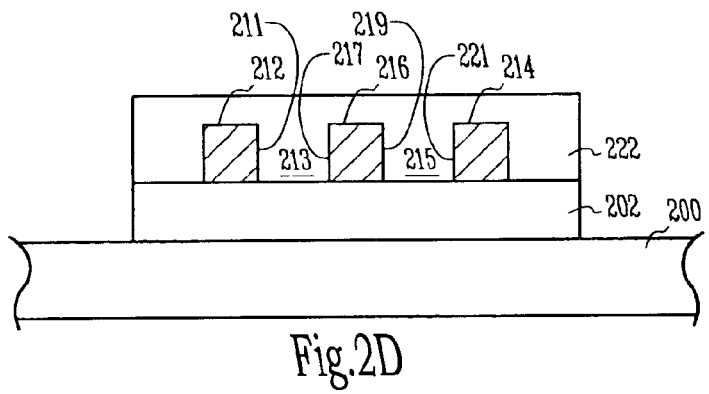
FIG. 2D is a cross sectional view in accordance with the teachings of the present invention of an upper cladding deposited on the waveguides and resonator in a processing step subsequent to FIG. 2C.

With reference to FIG. 2D, a third layer 222 or upper cladding is deposited on the surface of the waveguides 212, 214 and resonator 216 and portions of the first layer 202 not having such structures formed thereon. The upper cladding is deposited to a thickness sufficient to prevent external films and circuitry from interfering with the light propagated in the waveguide during use. For reference purposes only, the upper cladding and lower cladding are, in one embodiment, deposited to the same thickness of about 4 microns nominally.

In another embodiment, the third layer is a second silicon oxide layer deposited in the same manner as previously described for the first layer. In still another embodiment, the third layer has an index of refraction that is substantially equal to the index of refraction of the first layer.

It will be appreciated that the third layer 222 has an upper surface that can be used to stack multiple thermo optic devices by continuing the deposition, patterning and etching processes described herein. The upper surface may alternatively contain a heater (not shown) for changing a thermo optical property of the device as light propagates in the waveguide during use.

Figure 2E:
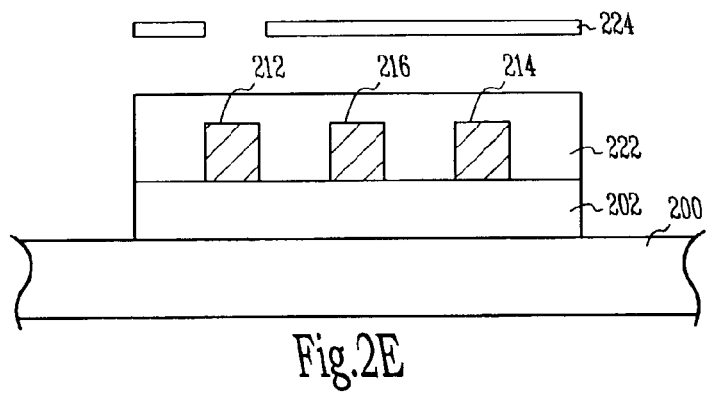
FIG. 2E is a cross sectional view in accordance with the teachings of the present invention of a second photomasking step in a processing step subsequent to FIG. 2D.
Figure 2F:
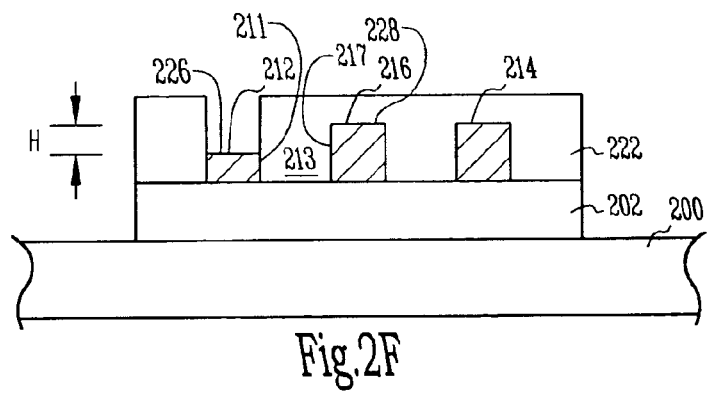
FIG. 2F is a cross sectional view in accordance with the teachings of the present invention of an attenuated height waveguide in a processing step subsequent to FIG. 2E.
Figure 2G:
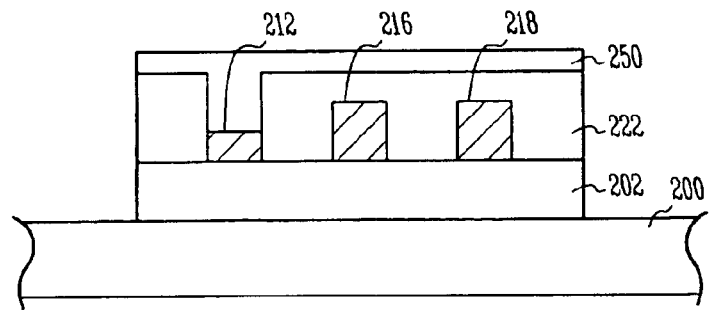
FIG. 2G is a cross sectional view in accordance with the teachings of the present invention of an attenuated height waveguide in a processing step subsequent to FIG. 2F.

With reference to FIG. 2E, after depositing the third layer 222, a second mask 224 is provided to attenuate the top of a waveguide as shown in FIG. 2F. In particular, the top 226 of input waveguide 212 is attenuated a height, H, from the top 228 of the resonator 216 by means of etching, especially dry etching.

Many things should now be apparent to those skilled in the art. For example, the input waveguide has a waveguide height that is shorter than the resonator height while the output waveguide remains the same height as the resonator height which is the same as their respective formation heights. As a result, the aspect ratio between the resonator and the input waveguide has decreased (in comparison to the prior art, FIG. 1A, for example) thereby maintaining the synchronicity condition.

In particular, the aspect ratio (a.r.) in area 213 has decreased where the input waveguide 212 and resonator 216 front one another along resonator surface 217 and input waveguide surface 211, wherein (a.r.) in area 213 is defined as the area of the input waveguide surface 211 to the area of the resonator surface 217 or (a.r.=area of input waveguide surface 211/area of resonator surface 217).

The resonator height from the surface 220 to the top 228 of the resonator 216, like the input or output waveguide height from surface 220 to top 226 or top 227 of the input waveguide 21 or output waveguide 214, respectively, is not required to be any particular height and is dictated according to the frequency characteristics demanded by the particular application in which the thermo optic device is used. For reference purposes, however, each of the heights can be found in a range from about 1 to about 2 microns in one embodiment.

In still a similar manner, the horizontal spacing (as viewed in the figure from left-to-right) between the grating and the waveguides, and length over which the grating and waveguides couple to each other, is determined by the performance requirements of the device. For reference purposes, however, the resonator is separated from the waveguide in one embodiment in a range from about 1 to about 2 microns.

To complete one embodiment of the thermo optic device, a fourth layer 250 may be deposited on the attenuated waveguide, the input waveguide, and the upper cladding, third layer 222. The fourth layer, like the upper cladding is deposited to a thickness sufficient to prevent outside light from interfering with the light propagated in the waveguide during use.

In one embodiment, the fourth layer is a third silicon oxide layer deposited in the same manner as previously described for the third layer. In another embodiment, the fourth layer has an index of refraction that is substantially equal to the index of refraction of the first and third layers.

It will be appreciated that the fourth layer 250 has an upper surface that can be used to stack multiple thermo optic devices by continuing the deposition, patterning and etching processes described herein. The upper surface may alternatively contain a heater (not shown) for changing a thermo optical property of the device as light propagates in the waveguide during use.

Figure 3:
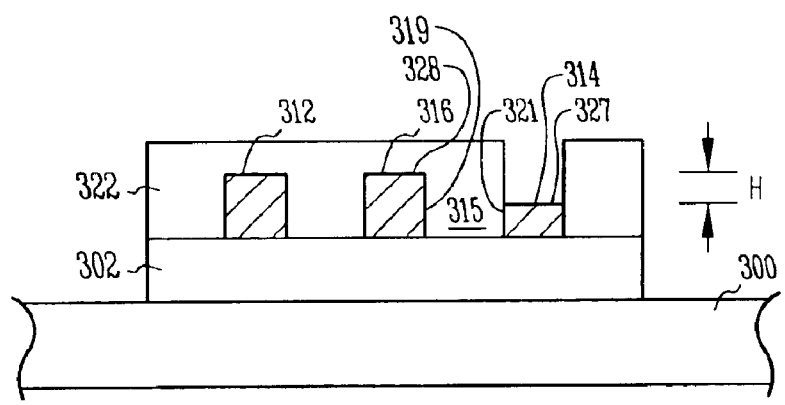
FIG. 3 is a cross sectional view in accordance with the teachings of the present invention of an alternate embodiment of an attenuated height waveguide.

With reference to FIG. 3, it will be appreciated that a reciprocal embodiment of the one shown in FIG. 2F can be achieved with respect to the output waveguide. In particular, the output waveguide 314 is attenuated in height from its formation height, which was substantially the same as the top 328 of the resonator 316, to the top 327. The input waveguide 312 remains the same height as the resonator.

Correspondingly, in area 315, the aspect ratio has decreased (in comparison to the prior art, FIG. 1A, for example) where the output waveguide 314 and resonator 316 front one another along resonator surface 319 and output waveguide surface 321, wherein (a.r.) in area 315 is defined as the area of the output waveguide surface 321 to the area of the resonator surface 319 or (a.r.=area of output waveguide surface 321/area of resonator surface 319). As such, synchronicity between the output waveguide and the grating has been achieved, even for high bandwidth gratings.

Figure 4:
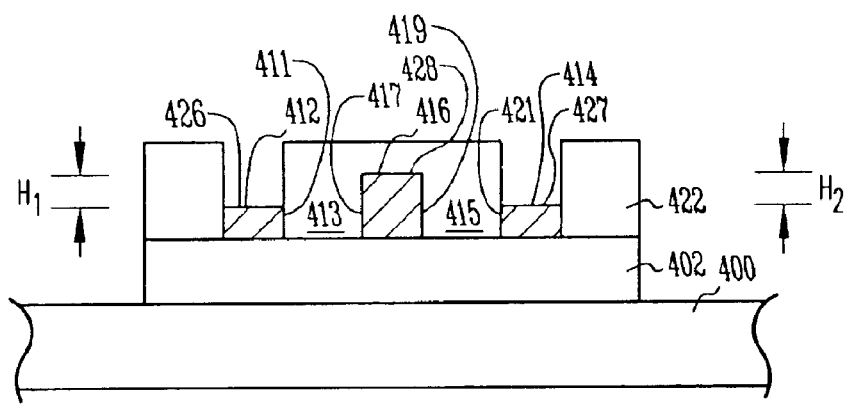
FIG. 4 is a cross sectional view in accordance with the teachings of the present invention of a plurality of attenuated height waveguides having the same height.

In FIG. 4, both the input and output waveguides 412, 414 have been attenuated in height, H1 and H2, respectively, where H1 is measured from the top 428 of the resonator to the top 426 of the input waveguide and H2 is measured from the top 428 of the resonator to the top 427 of the output waveguide 414. It will be appreciated that the resonator height from the lower cladding to the top 428 of the resonator 416 is the same height as the resonator formation height (FIG. 2C, for example) because the resonator has not been attenuated. In the embodiment shown, H1 is substantially equal to H2.

Figure 5:
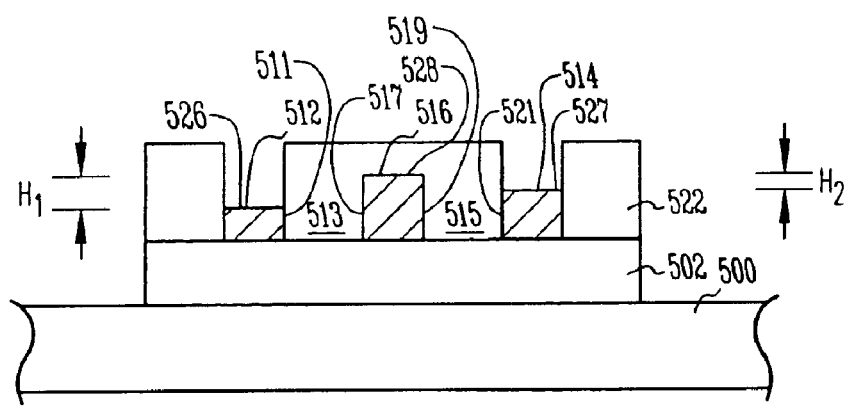
FIG. 5 is a cross sectional view in accordance with the teachings of the present invention of another embodiment of a plurality of attenuated height waveguides having different heights.

In FIG. 5, both the input and output waveguides are attenuated but are attenuated to different heights. In this embodiment, H1 is taller than H2.

Figure 6A:
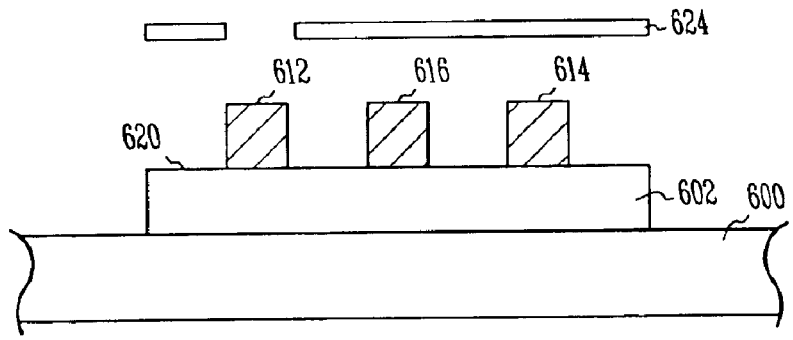
FIG. 6A is a cross sectional view in accordance with the teachings of the present invention of an alternate embodiment of a second photomasking step in a processing step subsequent to FIG. 2D.
Figure 6B:
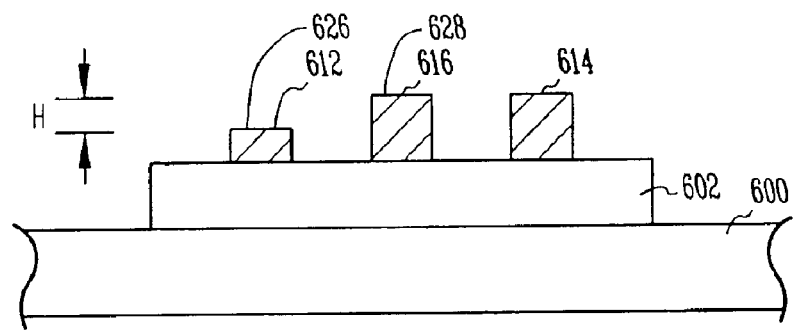
FIG. 6B is a cross sectional view in accordance with the teachings of the present invention of an attenuated height waveguide in a processing step subsequent to FIG. 6A.
Figure 6C:
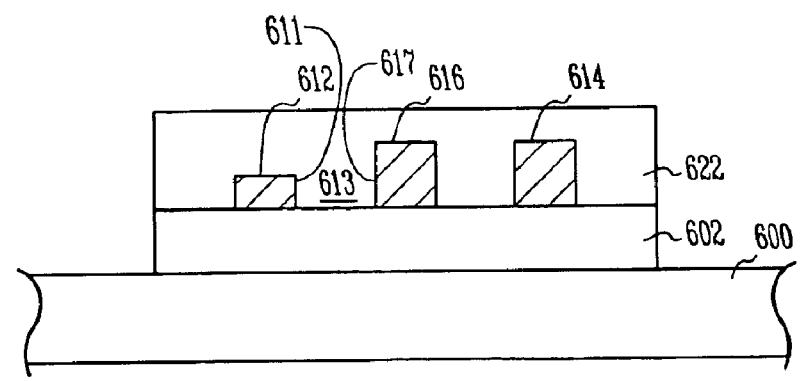
FIG. 6C is a cross sectional view in accordance with the teachings of the present invention of an upper cladding formed on the waveguides and resonator in a processing step subsequent to FIG. 6B.

With reference to FIGS. 6A through 6C, it will be appreciated that the attenuation of a waveguide, in another embodiment, can occur before the deposition of the upper cladding layer. In particular, a second mask 624 masks resonator 616 and output waveguide 614 on the surface 620 of the lower cladding 602 so that the input waveguide 612 may be attenuated in height via an etching process similar to the process steps of FIGS. 2E and 2F before deposition of the upper cladding. As a result, the input waveguide is attenuated in height, H, as defined from the top 628 of the resonator 616 to the top 626 of the input waveguide 612.

To complete the thermo optic device, an upper cladding 622 is then deposited on the surface of the waveguides 612, 614 and resonator 616 and portions of the first layer 602 or lower cladding not having such structures formed thereon. As before, the upper cladding is deposited to a thickness sufficient to prevent external films and circuitry from interfering with the light propagated in the waveguide during use. The upper cladding may still have a resistive heater or other thermo optic devices formed on an upper surface thereof as the application demands in which the device is to be used.

The input waveguide still has a waveguide height that is shorter than the resonator height while the output waveguide remains the same height as the resonator height which is the same as their respective formation heights. Like before, the aspect ratio of the resonators and the input waveguide has been altered to maintain synchronicity and allow higher bandwidth devices to be used.

In particular, the aspect ratio (a.r.) in area 613 has decreased where the input waveguide 612 and resonator 616 front one another along resonator surface 617 and input waveguide surface 611, wherein (a.r.) in area 613 is defined as the area of the input waveguide surface 611 to the area of the resonator surface 617 or (a.r.=area of input waveguide surface 611/area of resonator surface 617).

Figure 7:
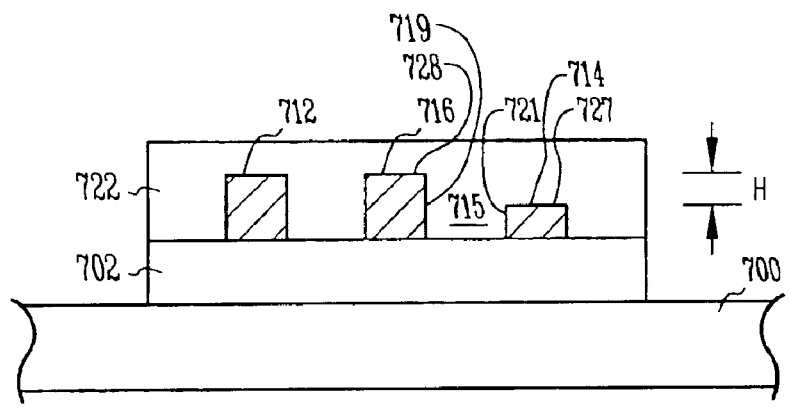
FIG. 7 is a cross sectional view in accordance with the teachings of the present invention of an alternate embodiment of an attenuated height waveguide.

In FIG. 7, in another embodiment of waveguide attenuation before deposition of the upper cladding, it is the output waveguide 714 that is attenuated in height, not the input waveguide 712. The aspect ratio (a.r.) in area 715 has decreased where the output waveguide 714 and resonator 716 front one another along resonator surface 719 and output waveguide surface 721, wherein (a.r.) in area 715 is defined as the area of the output waveguide surface 721 to the area of the resonator surface 719 or (a.r.=area of input waveguide surface 721/area of resonator surface 719).

Figure 8:
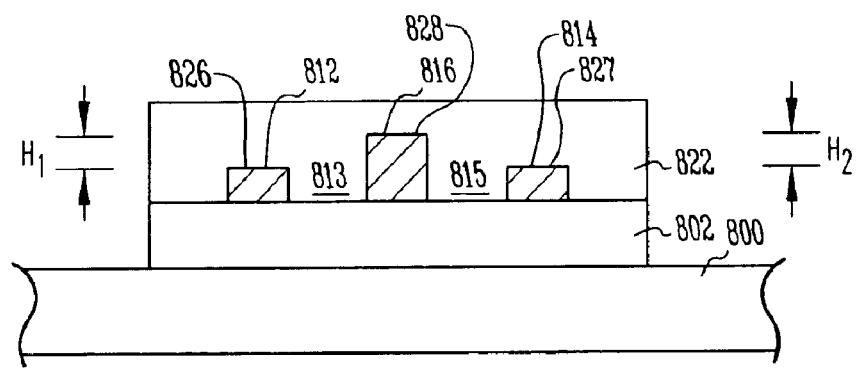
FIG. 8 is a cross sectional view in accordance with the teachings of the present invention of a plurality of attenuated height waveguides having the same height.
Figure 9:
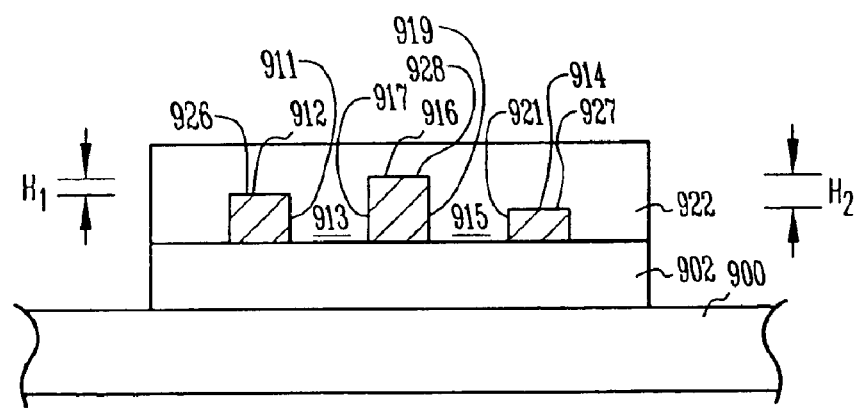
FIG. 9 is a cross sectional view in accordance with the teachings of the present invention of another embodiment of a plurality of attenuated height waveguides having different heights.

With reference to FIG. 8, in still another embodiment of attenuating the waveguide before deposition of the upper cladding, both the input and output waveguides 812, 814 have been attenuated. In particular, they have been attenuated a height H1 and H2, respectively, wherein H1 spans the distance from the top 828 of resonator 816 to the top 828 of the input waveguide and H2 spans the distance from the top 828 of resonator 816 to the top of the output waveguide 827. As shown, H1 is substantially equal or the same as H2. Correspondingly, the aspect ratios in areas 813 and 815 have decreased (in comparison to the prior art) where synchronicity can be maintained for higher bandwidth devices. In FIG. 9, a view similar to FIG. 8, H1 is less than H2.

While the foregoing teaches thermo optic devices where synchronicity is achieved by attenuating the thickness of the waveguides, in an alternate embodiment of the present invention, it may be desirable to attenuate the thickness of the grating to limit the synchronicity.

Figure 10:
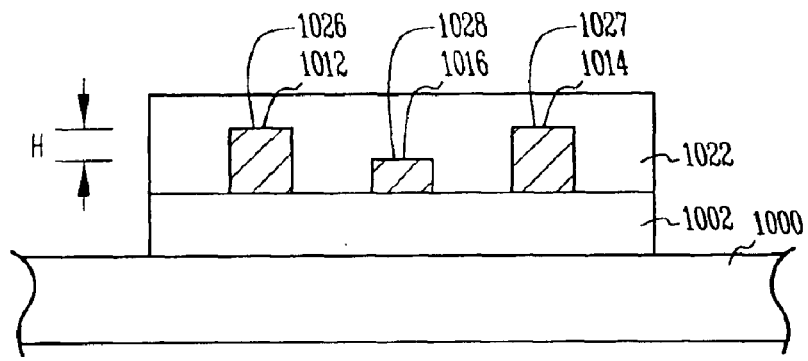
FIG. 10 is a cross sectional view in accordance with the teachings of the present invention of an attenuated height resonator.
Figure 11:
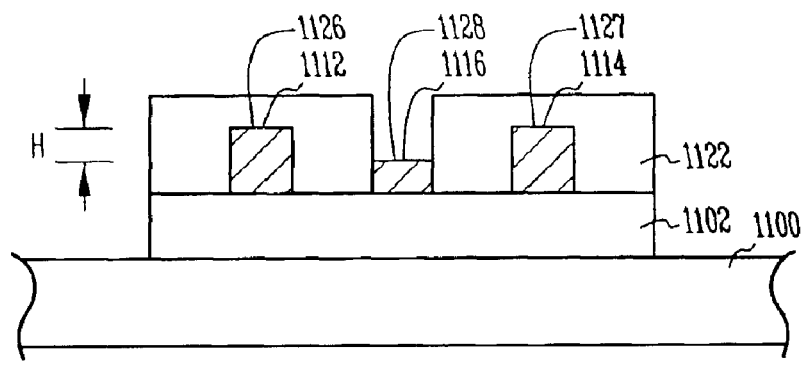
FIG. 11 is a cross sectional view in accordance with the teachings of the present invention of another embodiment of an attenuated height resonator.

For example, in FIGS. 10 and 11, it is the resonator having an attenuated height, not the waveguides. In particular, in FIG. 10, the resonator 1016 is attenuated in height from its formation height, which was substantially co-equal with the top 1026 of the input waveguide 1012 and the top 1027 of the output waveguide, to the top 1028. The upper cladding 1022, in this embodiment, is formed on the resonator, waveguides and lower cladding 1002 after the resonator is attenuated from its resonator formation height.

In FIG. 11, the upper cladding 1122 is formed on the resonator 1116, the input waveguide 1112, the output waveguide 1114 and the lower cladding 1102 before the resonator 1116 is attenuated in height to top 1128 from its formation height which was substantially equal to top 1126 and 1127 of the input and output waveguides, respectively.

Figure 12A:
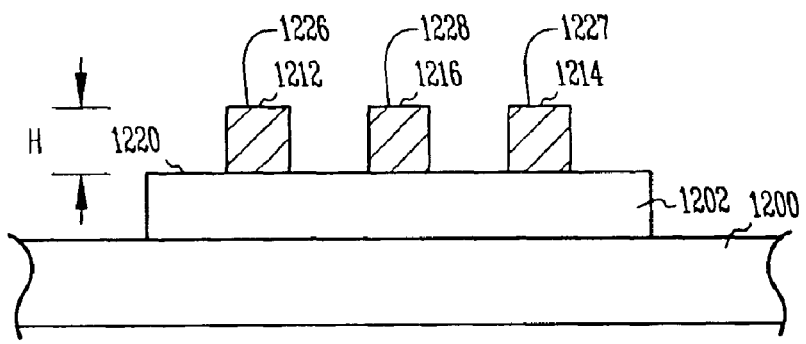
FIG. 12A is a cross sectional view in accordance with the teachings of the present invention of waveguides and a resonator formed on a lower cladding.
Figure 12B:
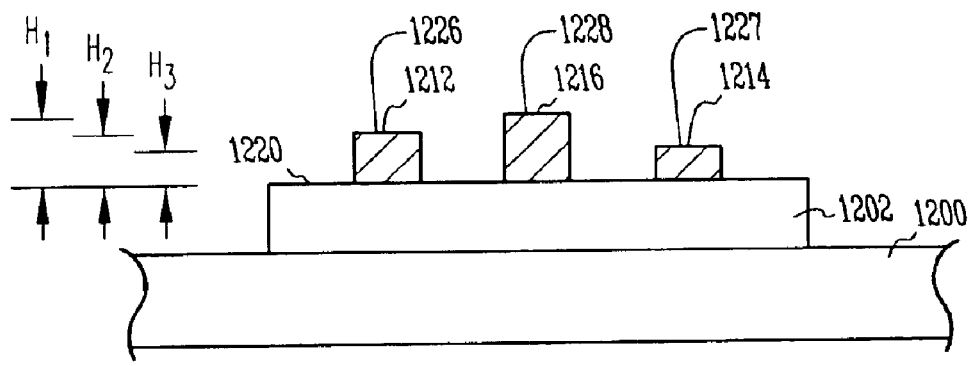
FIG. 12B is a cross sectional view in accordance with the teachings of the present invention of an attenuated height input waveguide, an attenuated height output waveguide and an attenuated height resonator all having different heights.

It should be appreciated that even further embodiments of the present invention include attenuating the heights of all the waveguides and the resonator and attenuating them to different heights. For example, in FIGS. 12A and 12B, a resonator 1216 and a plurality of waveguides, input waveguide 1212 and output waveguide 1214, are formed on a lower cladding, first layer 1202 in accordance with the previously described techniques. Each has a formation height, H, which is substantially equal and spans the distance from the surface 1220 of the lower cladding to their respective top surfaces, 1228, 1226 and 1227.

After attenuation (FIG. 12B), the resonator 1216 has a resonator height, H3, shorter than its formation height and spans the distance from the surface 1220 to top 1228. The input waveguide 1212 has an input waveguide height, H2, shorter than its formation height and spans the distance from the surface 1220 to top 1226. The output waveguide 1227 has an output waveguide height, H3, shorter than its formation height and spans the distance from the surface 1220 to top 1227. As shown, H3 is greater than H2 which is greater than H1. It should be appreciated, however, that the heights could all be variously arranged so that the waveguides are taller than the resonator or that the output waveguide is the tallest, etc. As with previous embodiments, these attenuated structures could be attenuated before or after the deposition of an upper cladding layer, not shown.

Figure 13:
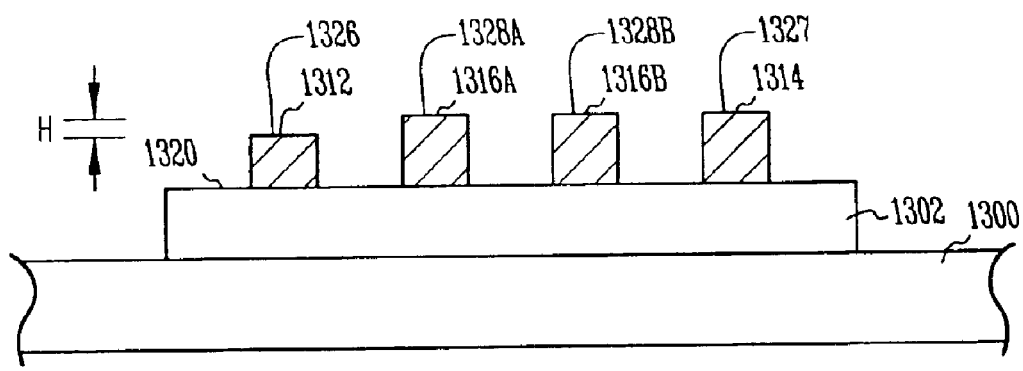
FIG. 13 is a cross sectional view in accordance with the teachings of the present invention of an attenuated height waveguide coupled to an output waveguide via a plurality of resonators.

In FIG. 13, it will be appreciated that thermo optic devices of the present invention may be formed with a more than a single resonator to achieve even further variations in the frequency characteristics of the device as application demand varies. In particular, a plurality of resonators 1328A and 1328B are formed on a surface 1320 of the lower cladding between the input and output waveguides 1312, 1314, to couple a light signal from the input to the output waveguide during use. As previously described for single resonator embodiments, the plurality of resonators are formed in the same process steps as the waveguides and are formed of the second material. Each resonator has a formation height that is substantially equal with the waveguides when formed. After the input waveguide is attenuated, as shown in this embodiment, the input waveguide is shorter than either of the resonators and output waveguide. In particular, it is shorter by distance, H, spanning from the top 1328A and 1328B to the top 1326 of the input waveguide 1312. The output waveguide 1314 has a top 1327 that is substantially equal to the top 1328 of the resonators. It will be appreciated, that the pluralities of resonators may also be attenuated in accordance with previously shown single resonator embodiments. Likewise, the output waveguide may also be attenuated from its formation height. All embodiments may attenuate heights before or after the deposition of an upper cladding, not shown. Those skilled will appreciate that still other numbers of resonators, beyond the two shown, could be formed.

Figure 14:
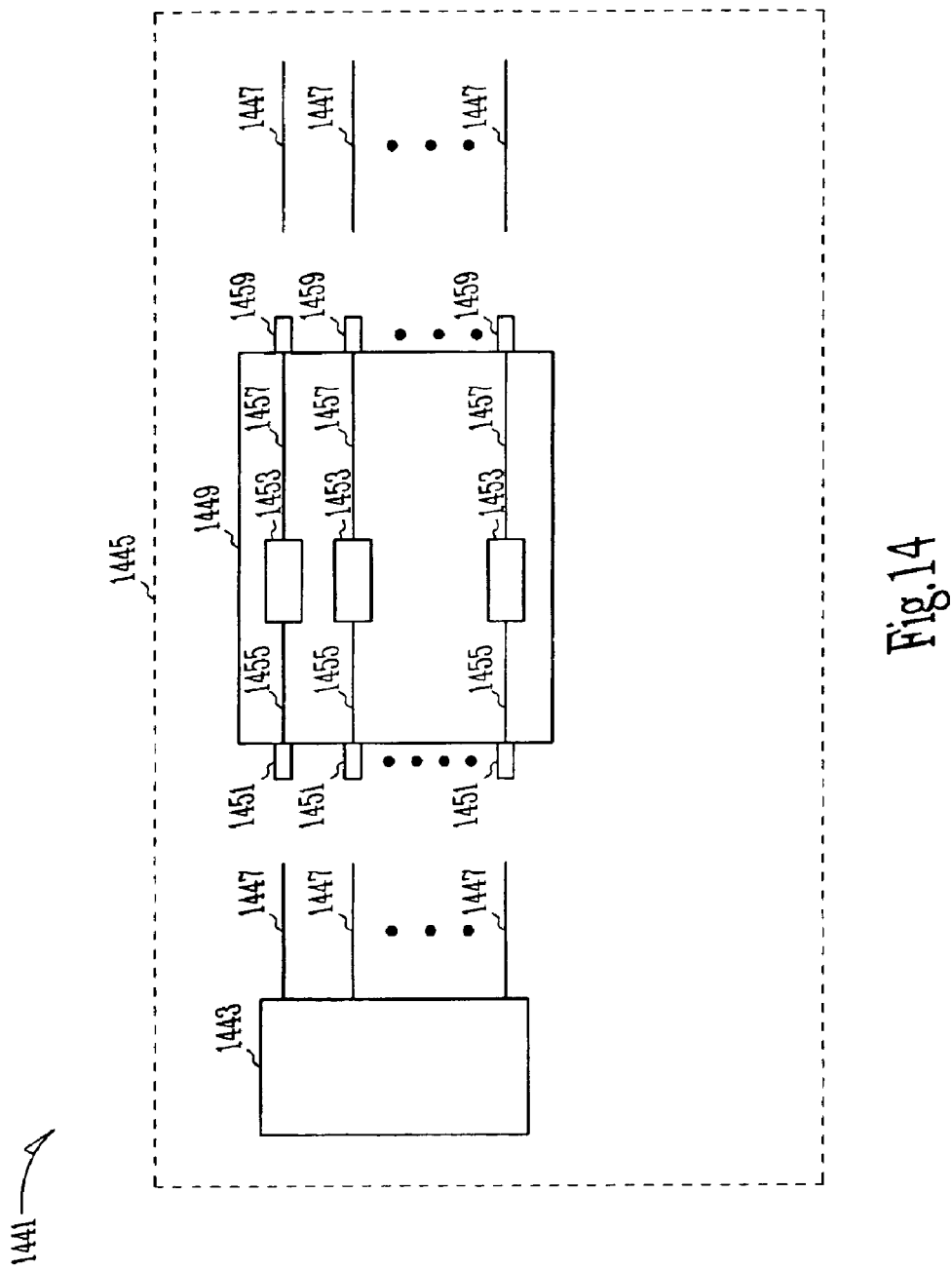
FIG. 14 is a block diagram of a system having a thermo optic package comprising waveguides formed in accordance with the teachings of the present invention.

With reference to FIG. 14, a system, having as part thereof a resonator or waveguide formed in accordance with the teachings of the present invention, is shown generally as 1441. The system may be an exclusively fiber optic system or may be a system having other software and hardware devices, as indicated by the dashed line 1445, operably coupled to at least one fiber optic component thereof.

In either system, a light source 1443 will be provided as the source for propagating light signals along at least one fiber optic line 1447. Well known light sources include, but are not limited to, laser light sources. In the embodiment shown, the system 1441 includes a plurality of fiber optic lines 1447.

Coupleable to the fiber optic lines via a plurality of input fiber optic ports 1451 is a thermo optic package 1449. Contained within the thermo optic package is at least one thermo optic device 1453 having at least one waveguide or resonator formed in accordance with the present invention. In the embodiment shown, the thermo optic device 1453 is coupled to the input fiber optic port 1451 via an input connector 1455 while an output connector 1457 couples the thermo optic device to an output fiber optic port 1459. In turn, the output fiber optic port 1459 is coupled to another fiber optic line 1447 of system 1441.

During use, a system user merely needs to couple fiber optic lines 1447 to the input and output fiber optic ports of the package 1449 to readily achieve at least one resonator or waveguide having an increased or decreased bandwidth as necessary.

Figure 15:
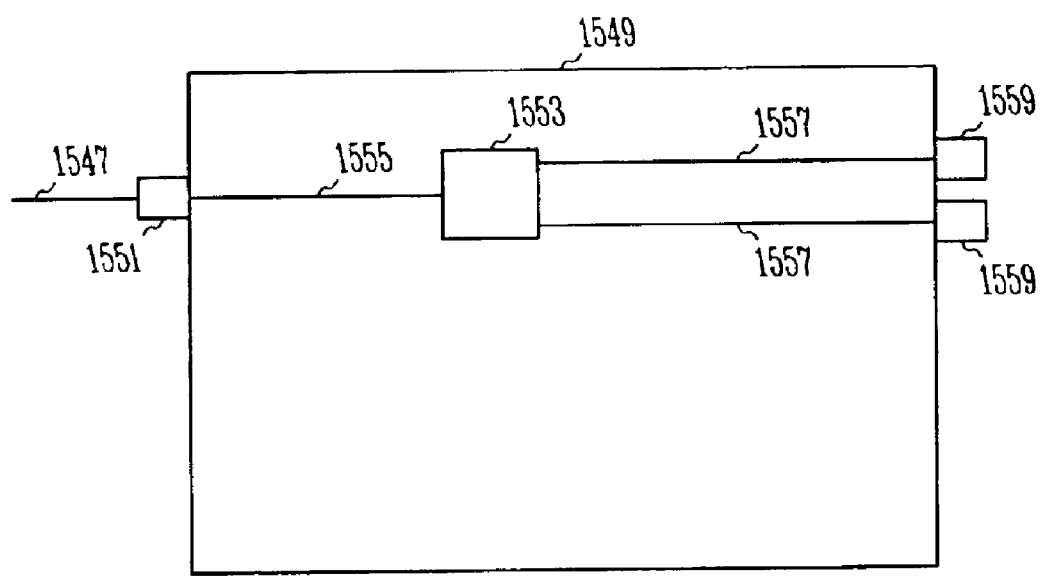
FIG. 15 is an alternative embodiment of a thermo optic package comprising waveguides formed in accordance with the teachings of the present invention.

With reference to FIG. 15, an alternative embodiment of a thermo optic package 1549 is shown having a thermo optic device 1553 with a single input connector 1555 and a plurality of output connectors 1557. The input connector 1555 connects with input fiber optic port 1551 which is readily matable with a fiber optic line 1547 of a system. The output connectors 1557 of thermo optic device 1553 are each matable with an output fiber optic port 1559.

It will be appreciated that while shown as a single input connector with two output connectors, the thermo optic device 1553 having a resonator or waveguide formed in accordance with the present invention may alternatively have two or more input connectors and one or more output connectors depending upon the type and desired use of the thermo optic device 1553.

CONCLUSION

The above structures and fabrication methods have been described, by way of example, and not by way of limitation, with respect to waveguides for thermo optic devices.

In particular, a waveguide and resonator are formed in the same process steps on a lower cladding of the thermo optic device and each have a formation height that is substantially equal. Thereafter, the formation height of the waveguide is attenuated. In this manner, the aspect ratio as between the waveguide and resonator in an area where the waveguide and resonator front or face one another decreases (in comparison to the prior art) thereby restoring the synchronicity between the waveguide and the grating and allowing higher bandwidth configurations to be used. The waveguide attenuation is achieved by photomasking and etching the waveguide after the resonator and waveguide are formed. In one embodiment the photomasking and etching is performed after deposition of the upper cladding. In another, it is performed before the deposition.

In another embodiment, a plurality of waveguides, an input and output waveguide, are attenuated from their respective formation heights to a different or substantially equal waveguide height. In still another embodiment, a plurality of resonators are formed between the input and output waveguides.

In still another embodiment, resonator(s) are attenuated before or after deposition of the upper cladding. In this manner, the aspect ratio increases thereby decreasing the available signal bandwidth.

Thermo optic devices, thermo optic packages and fiber optic systems having these waveguides are also taught.

As a result, waveguides of this invention can be formed quicker and cheaper without any corresponding sacrifice in quality, reliability or longevity.

The present invention has been particularly shown and described with respect to certain preferred embodiment(s). However, it will be readily apparent to those of ordinary skill in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. An apparatus, comprising:
  a lower cladding;
  a waveguide on the lower cladding having one of an attenuation height and a formation height; and
  a resonator on the lower cladding having an other one of the attenuation height and the formation height, the attenuation height being shorter than the formation height; and
  only one of the waveguide and the resonator having the attenuation height, the attenuation height being attenuated after originally having the formation height, and only an other of the waveguide and the resonator being left un-attenuated and at the formation height.

2. The apparatus according to claim 1, wherein the waveguide further includes an input waveguide and an output waveguide.

3. The apparatus according to claim 2, wherein the resonator further includes two resonators between the input and output waveguides.

4. The apparatus according to claim 1, further including an upper cladding on the waveguide and the resonator.

5. The apparatus according to claim 1, further including a substrate, the lower cladding being on the substrate.

6. An apparatus, comprising:
  a substrate;
  a lower cladding on the substrate;
  an input waveguide form on the lower cladding and originally having an input waveguide formation height;
  an output waveguide formed on the lower cladding and originally having an output waveguide formation height; and
  a resonator formed on the lower cladding and originally having a resonator formation height, each of the waveguide formation heights and the resonator formation height originally being a same height and formed at in a same time, and where one of the input waveguide formation height, the output waveguide formation height and the resonator formation height having been attenuated to be an attenuated height through removal of part of the formation height such that the attenuated height presents a smaller facing area to the formation heights.

7. The apparatus according to claim 6, further including an upper cladding on one of the input and output waveguides and the resonator.

8. The apparatus according to claim 7, further including a layer on the upper cladding.

9. The apparatus according to claim 6, wherein the resonator is between the input and output waveguides to couple a light signal from the input to the output waveguide during use.

10. A thermo optic waveguide, comprising:
  a substrate;
  a first layer on the substrate having a first index of refraction;
  a second layer on the first layer, the second layer having a second index of refraction and forming a resonator and a waveguide, the resonator originally having a resonator formation height and the waveguide originally having a waveguide formation height, the resonator formation height and the waveguide formation height being originally fabricated substantially in the same processing step and at the same time to have a same formation height, where one of the waveguide formation height and the resonator formation height having been attenuated to be an attenuated height, the other of the waveguide formation height and the resonator formation height being left un-attenuated at the formation height, respectively, the attenuation height being less than the formation height through partial material removal of the second layer; and
  a third layer on the second layer, the third layer having a third index of refraction.

11. The thermo optic waveguides according to claim 10, wherein the first index of refraction is one of lower and higher than the second index of refraction.

12. The thermo optic waveguide according to claim 10, wherein the first index of refraction is substantially equal to the third index of refraction.

13. The thermo optic waveguide according to claim 10, wherein the second index of refraction is one of lower and higher than the third index of refraction.

14. A thermo optic waveguide, comprising:

a silicon oxide layer; and a silicon oxynitride layer on the silicon oxide layer forming an input waveguide, an output waveguide and a resonator, the input waveguide originally having an input waveguide formation height, the output waveguide originally having an output waveguide formation height, the resonator originally having a resonator formation height, the resonator formation height being the same as the input and output waveguide heights and fabricated at the same time, where one of a group comprising the input waveguide formation height, the output waveguide formation height and the resonator formation height being attenuated to be an attenuated height, and others of the group comprising input waveguide formation height, the output waveguide attenuated height and the resonator formation height being left un-attenuated.

15. The thermo optic waveguide according to claim 14, further including another silicon oxide layer on the silicon oxynitride layer.

16. The thermo optic waveguide according to claim 14, further including a substrate, the silicon oxide layer being on the substrate.

17. The thermo optic waveguide according to claim 16, wherein the substrate is one of a silicon layer and a printed circuit board.

18. A thermo optic waveguide, comprising:

a substrate;

a lower cladding on the substrate being formed of a first material having a first index of refraction;

an input waveguide and an output waveguide on the lower cladding being formed of a second material having a second index of refraction, the input waveguide having an input waveguide height, the output waveguide having an output waveguide height;

a resonator on the lower cladding between the input and output waveguides to couple a light signal from the input waveguide to the output waveguide during use, the resonator being formed of the second material, the resonator having a resonator height, the resonator height presenting a greater surface area to one of the input and output waveguide heights due to post formation attenuation by masking and etching the second material of the at least one of the input and output waveguide heights; and an upper cladding on one of the input and output waveguides and the resonator being formed of a third material having a third index of refraction, the first index of refraction and the third index of reflection being substantially equal, the second index of refraction being one of higher and lower than the first index of reflection.

19. The thermo optic waveguide according to claim 18, further including another resonator between the input and output waveguides.

20. The thermo optic waveguide according to claim 19, wherein the another resonator is formed of the second material.

21. The thermo optic waveguide according to claim 20, wherein the another resonator has an another resonator height, the another resonator height being one of taller and shorter than the resonator height.

22. The thermo optic waveguide according to claim 21, wherein the first and third materials are silicon oxides.

23. The thermo optic waveguide according to claim 22, wherein the second material is a silicon oxynitride.

24. A thermo optic package, comprising:

a thermo optic device having:

a lower cladding;

a waveguide on the tower cladding having one of an attenuation height and a formation height;

a resonator on the lower cladding having an other one of the attenuation height and the formation height, the attenuation height being shorter than the formation height; and only one of the waveguide and the resonator having the attenuation height, the attenuation height being attenuated after originally having the formation height, and an other of the waveguide and the resonator being left un-attenuated and at the formation height.

25. The thermo optic package according to claim 24, further including an input connector and an output connector coupled with the thermo optic device.

26. The thermo optic package according to claim 25, further including an input fiber optic port coupled to the input connector and an output fiber optic port coupled to the output connector.

27. A system having a fiber optic line, comprising:

a thermo optic package coupled with the fiber optic line; and a thermo optic device in the thermo optic package having:

a lower cladding;

a waveguide on the lower cladding having one selected from a group of an attenuation height and a formation height;

a resonator on the lower cladding having an other one selected from the group of the attenuation height and the formation height, the attenuation height being shorter than the formation height; and only the one, selected from the group of the waveguide and the resonator, having the attenuation height, the attenuation height being attenuated by etching down from the formation height, and only the other, selected from the group of the waveguide and the resonator, being left un-attenuated and at the formation height.

28. The system of claim 27, wherein the thermo optic package further includes at least one input fiber optic port and at least one output fiber optic port.

29. The system of claim 28, wherein the thermo optic device includes at least one input connector coupled to the at least one input fiber optic port and at least one output connector coupled to the at least one output fiber optic port.

* * * * *

UNITED STATES PATENT AND TRADEMARK OFFICE
CERTIFICATE OF CORRECTION

PATENT NO. : 7,006,746 B2  Page 1 of 1
DATED : February 28, 2006
INVENTOR(S) : Blalock et al.

It is certified that error appears in the above-identified patent and that said Letters Patent is hereby corrected as shown below:

<u>Column 12,</u>
Line 11, delete "form" and insert -- formed --.
Line 59, delete "waveguides" and insert -- waveguide --.

<u>Column 13,</u>
Lines 51 and 55, delete "reflection" and insert -- refraction --.

<u>Column 14,</u>
Line 13, delete "tower" and insert -- lower --.

Signed and Sealed this

Thirteenth Day of June, 2006

JON W. DUDAS
*Director of the United States Patent and Trademark Office*